United States Patent [19]

Brown et al.

[11] Patent Number: 5,384,822
[45] Date of Patent: Jan. 24, 1995

[54] COMPUTER CONTROLLED TEST FACILITY FOR A TELECOMMUNICATION SWITCH

[75] Inventors: Ben G. Brown, Springville, Utah; John A. Krallmann, Warrenville, Ill.; Christopher D. Liesen, Naperville, Ill.; Mark J. Purdome, Hoffman Estates, Ill.

[73] Assignee: AT&T Corp., Murray Hill, N.J.

[21] Appl. No.: 906,956

[22] Filed: Jun. 30, 1992

[51] Int. Cl.⁶ .................... H04M 1/24; H04M 3/08
[52] U.S. Cl. ............................... 379/10; 379/12; 379/18
[58] Field of Search .............. 379/5, 6, 10, 11, 9, 379/12, 13, 14, 16, 17, 18

[56] References Cited

U.S. PATENT DOCUMENTS

| | | | |
|---|---|---|---|
| 4,922,515 | 5/1990 | Simpson, Jr. | 379/6 |
| 4,924,489 | 5/1990 | Lawrence et al. | 379/6 |
| 4,937,850 | 6/1990 | Borbas et al. | 379/10 X |
| 4,945,554 | 7/1990 | Krause et al. | 379/10 |
| 5,065,422 | 11/1991 | Ishikawa | 379/11 |
| 5,187,732 | 2/1993 | Suzuki | 379/5 |

OTHER PUBLICATIONS

"Universal call simulator for testing trunk equipment", *Electrical Communication*, 1980, Metzger et al.
"Local Call Simulator", W. Johner, 1980.
"Teltone ® Innovating Solutions for Telecommunications" Users Manuel—T-310 Telephone Access Unit—Technical Practice T-310-501, Issue 4, Jun. 25, 1991, pp. 1-56.

*Primary Examiner*—Stephen Chin
*Assistant Examiner*—Paul Loomis
*Attorney, Agent, or Firm*—Charles L. Warren

[57] ABSTRACT

A plurality of telephone devices responsive to computer commands are connected to a telecommunications switch. A computer controlled apparatus sends command messages to the telephone devices causing them to initiate conventional actions such as dialing. The apparatus receives reply messages from the telephone devices which represent the status of parameters such as ringing associated with the telephone device. Reply messages are identified relative to previously sent command messages. If the actual status of parameters represented by a reply message matches an anticipated status of the parameters corresponding to actions expected in response to a command message, a successful test of the switch functions associated with the command message results. An unmatched condition corresponds to a test failure requiring user analysis.

20 Claims, 6 Drawing Sheets

FIG. 5
PORT MESSAGE HANDLING ROUTINE

FIG. 6
FUNCTION HANDLING ROUTINE

COMPUTER CONTROLLED TEST FACILITY FOR A TELECOMMUNICATION SWITCH

BACKGROUND OF THE INVENTION

This invention addresses the testing of a telecommunications switch and is especially useful for testing a switch at its installed location. The invention includes a computer controlled test facility capable of running automated tests by controlling a plurality of telephone devices coupled to the switch.

The testing of a modem digital telecommunications switch presents a substantial challenge. The flexibility and power of such switches leads to an increasingly complicated test requirement. As used herein, testing refers to initial testing to establish correct functionality, testing intended to isolate the cause of a problem, and testing for continuous evaluation purposes. Special purpose test fixtures have been used for switch testing. However, such fixtures may be unique to a particular switch to be tested and may be too physically large to be useful for testing switches in a customer environment. Also such test fixtures typically only emulate telephones as opposed to using "real" telephones.

Once a switch has been installed at a customer location, testing of the switch prior to putting it into service minimizes possible service disruptions to telephone users to be supported by the new switch. Manual operation of conventional telephones connected to a switch can be utilized to test the switch by placing calls and activating features. Static switch problems, i.e., problems which result in the same repeatable failure in response to the same stimulus, are normally relatively easy to identify. However, other failures which occur only sometimes in response to a given stimulus are very difficult to locate utilizing manual test procedures. Such problems may involve several variables, all of which may not be under test control at the time of the failure. Because of the human error factor in manually generating a large number of repetitive calls, it is difficult to prevent test errors. A large number of calls and actions may be required in attempting to isolate difficult switch problems.

There exists a need for an improved facility to permit the accurate generation of a plurality of switch test conditions, especially where the switch has been installed at a final customer location.

SUMMARY OF THE INVENTION

An object of the present invention is to provide an improved test facility which permits the automatic generation of a plurality of tests of a telecommunications switch, especially where the switch must be tested after its final installation.

In accordance with an embodiment of the present invention, a plurality of telephone devices are connected to a digital switch to be tested. A personal computer is connected by communication lines to each of the telephone devices. Each telephone device is capable of responding to commands received from the personal computer to take action just as if a manual action were initiated at the telephone device, such as an on-hook to off-hook condition, dialing, etc. The personal computer operates in accordance with a control program that sends sequential command messages to the telephone devices. The telephone devices respond to the command messages by initiating actions corresponding to the command messages and send reply messages to the personal computer representing the status of parameters associated with the telephone devices such as an indication of tone detection, ringing, etc. The program operating on the personal computer identifies a received reply message that is responsive to a predetermined one of the command messages. The actual status of parameters represented by the reply message is compared to the anticipated status of the parameters corresponding to action expected in response to the command message. A match of the actual and anticipated status of the telephone device parameters indicates a successful (expected) reaction in response to the command message. A plurality of command messages are utilized to place calls and utilize features supported by the telephone devices and the switch.

DETAILED DESCRIPTION

Figure 1:
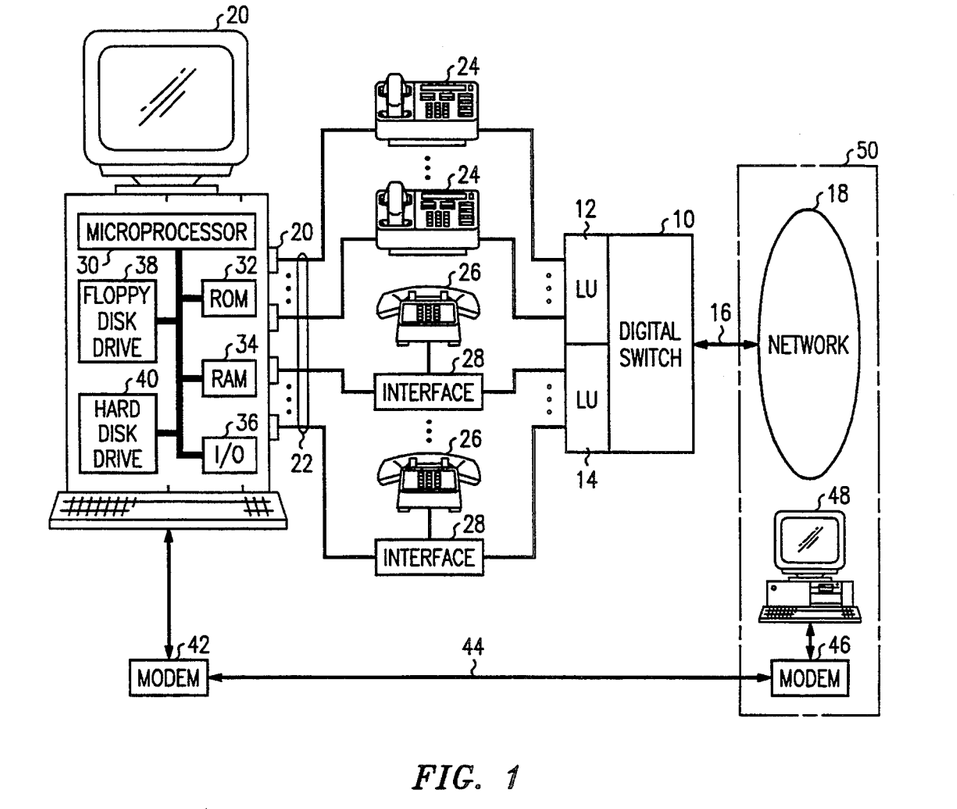
FIG. 1 is a block diagram of a telecommunications system which incorporates an embodiment in accord with the present invention.

FIG. 1 illustrates a telecommunications system having a digital switch 10 such as an AT&T 5ESS ® switch including line units 12 and 14 which support digital, e.g., ISDN, and analog customer premises equipment (CPE), respectively. A plurality of trunk lines 16 connect the digital switch 10 to a telecommunications network 18 which may consist of the public switched telephone network.

A personal computer (PC) 20 is connected by a plurality of communication lines 22 which support communications such as by an RS-232 communication protocol. Communication lines 22 are coupled to telephone devices including digital telephones 24 and conventional analog telephones 26 as coupled by interface devices 28, and are coupled to PC 20 via asynchronous communication ports 21. The digital telephones 24 may comprise ISDN compatible telephones in which telephone functions that are normally activated manually can be remotely activated by command messages sent by PC 20. Similarly, interface devices 28 permit PC 20 to control functions that are normally activated manually using analog telephones 26. This control capability permits PC 20 to cause the coupled telephones to generate calls and utilize features in accordance with a user definable program that controls the sending of corresponding command messages, thereby eliminating the need for manual interaction with the telephones. Telephones 24 and interface devices 28 associated with an,-dog telephones 26 respond to status inquiry messages sent by PC 20 with reply messages that represent the status of telephone parameters (conditions) such as ringing, tones being received, and lamps ON or OFF. It should be noted that a digital switch 10 installed at a central office may also serve customers having digital and analog telephones (not shown).

The personal computer 20 includes a microprocessing unit (MPU) 30, read-only memory (ROM) 32, random access memory (RAM) 34, an input/output interface 36, floppy drive 38, and a hard drive 40. A plurality of test programs or scripts are preferably stored in computer 20 to facilitate testing of digital switch 10 via the computer controllable telephone devices. A conventional modem 42 enables computer 20 to communicate over line 44 which is connected to a modem 46 coupled to data terminal equipment such as a personal computer 48. As indicated by the dashed line 50, personal computer 48 with associated modem 46 are located at a remote location relative to computer 20 and digital switch 10. In a typical testing environment, PC 20 and the test telephone devices will be located at a common site such as at the central office at which switch 10 is installed. The personal computer 48 comprises substantially similar elements as described with respect to personal computer 20. Computers 20 and 48 include known communication programs permitting each to communicate with the other via the corresponding modems. The selection and control of test scripts executed by computer 20 may be controlled by a person located at personal computer 20, or may be controlled by a person located at computer 48. Since a plurality of test scripts can be scheduled to run sequentially, user control of PC 20 may not be required for extended periods of time, e.g., several hours.

Figure 2:
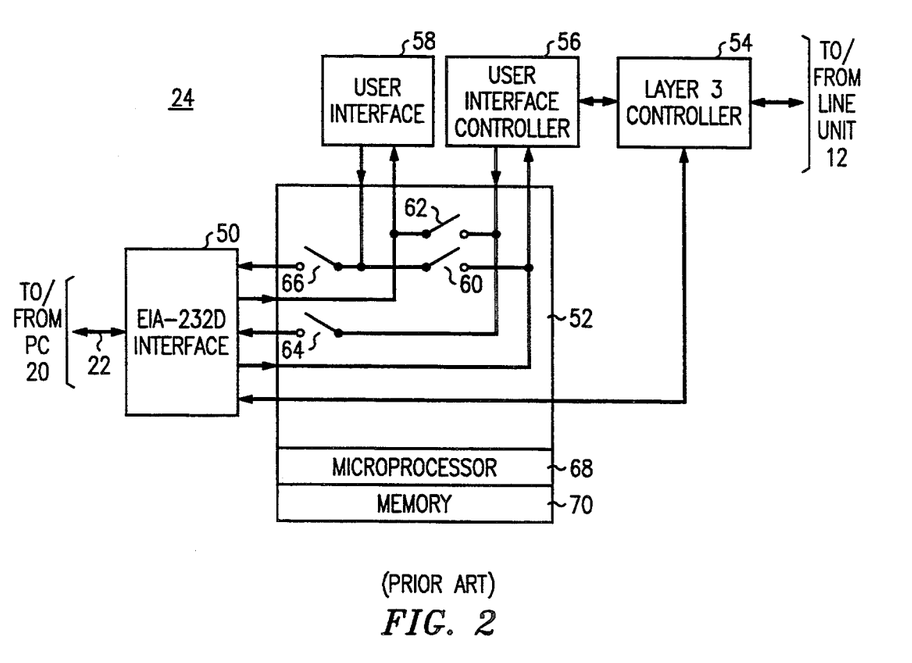
FIG. 2 is a block diagram illustrating a prior art digital phone suited for use in the present invention.

FIG. 2 illustrates a telephone device 24 as referenced in FIG. 1. In this illustrative example, telephone 24 operates in an ISDN system as a terminal adaptor and is capable of operating in accordance with CCITT Recommendation Q.931. The telephone 24 includes an EIA-232-D interface 50, a data terminal equipment interface 52, a layer 3 controller 54, a user interface controller 56, and a user interface 58. Elements 50 and 54-58 are known and defined in accordance with CCITT recommendations. The telephone 24 has multiple operating modes as defined by the position of switches 60, 62, 64, and 66 in data terminal interface 52. The state of the switches are controlled by an MPU 68 and a memory 70 associated with interface 52. This MPU and memory are associated with and control the functional components 50 and 54-58. The interface 52 communicates via interface 50 and line 22 to PC 20. Commands provided by PC 20 are received by MPU 68 and reply messages originated by MPU 68 are transmitted to PC 20. The telephone 24 is connected to line unit 12 associated with digital switch 10 which provides communications utilizing conventional ISDN signaling.

The telephone 24 is capable of operating in different modes. In one mode switches 60 and 62 are closed and switches 64 and 66 open to provide conventional manual telephone utilization in which messages to or instructions from PC 20 are not utilized. In the following modes of operation, it is desired that PC 20 take an active pan in the communications. In the second operating mode, messages from user interface controller 56 which are destined for user interface 58 are routed by EIA-232D interface 50 to PC 20 and then to user interface 58. This routing is accomplished by having switch 64 closed and switch 62 open. Similarly, messages from user interface 58 which are destined for user interface controller 56 are routed by EIA-232D interface 50 to PC 20. This routing is accomplished by having switch 66 closed and switch 60 open. In a third operating mode, messages from user interface 58 are intended to be routed only to PC 20 and a reply message from the PC 20 returned to user interface 58. This routing is achieved by having switch 66 closed and switch 60 open. A fourth operating mode occurs when messages from user interface controller 56 are intended to be routed only to PC 20 and a reply message from the PC 20 returned to user interface controller 56. This routing is achieved by having switch 64 closed and switch 62 open. By using such routing, messages to and from the user interface controller 56 (and hence, to line unit 12) and user interface 58 are controlled by PC 20. The telephone device 24 may comprise an AT&T 7507 ISDN voice terminal which operates in accordance with the teaching disclosed herein.

Additional information concerning this implementation can be found in U.S. patent application Ser. No. 07/580238, entitled "Interface for a Data Telephone and Data Terminal in a Digital Telephone System" filed Sept. 10, 1990; this application is incorporated herein by reference.

Figure 3:
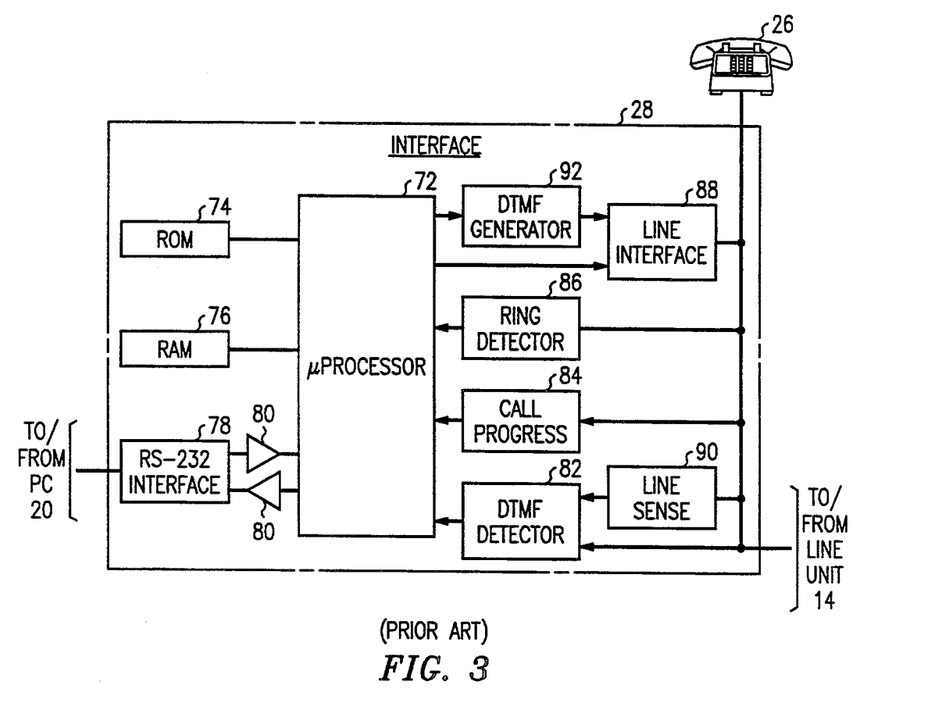
FIG. 3 is a block diagram of a prior art interface device which permits a computer to control functions associated with a conventional analog telephone.

FIG. 3 illustrates an embodiment of an interface 28 as referenced in FIG. 1. An MPU 72 operating in conjunction with ROM 74 and RAM 76 provides communications with PC 20, generates control signals to control telephone functions, and detects the status of conditions associated with telephone 26 as usually determined by signals transmitted from line unit 14. PC 20 communicates by line 22 with MPU 72 via RS-232 interface 78 which is coupled to MPU 72 by buffers 80. Signals to and from switch 10 are coupled via LU 14 to dual tone multiple frequency (DTMF) detector 82, call progress detector 84, ring detector 86, line interface 88, and line sense detector 90, as well as conventional analog telephone 26. Lines sense detector 90 is utilized to activate DTMF detector 82 when the line is sensed to be active. In response to a command from PC 20, MPU 72 initiates a call by having line interface 88 generate an off-hook condition and DTMF generator 92 generate desired DTMF digits to be dialed which are transmitted to line unit 14 for call processing. MPU 72 also provides information to PC 20 concerning the status of the associated telephone parameters including the receipt of DTMF tones, the status of the line as indicated by call progress detector 84 and the presence of ringing as determined by ring detector 86. These conditions are translated into predetermined ASCII characters transmitted to PC 20 via line 22. Thus, interface 28 enables PC 20 to control the generation of calls and functions, and receive commands representing the status of corresponding telephone parameters.

Each of the telephones 24 and 26 utilized in testing in accordance with the present invention is preferably characterized in a data base stored in computer 20. The purpose of these characterization parameters is to allow telephones to be selected for a given test program that have sufficient features and characteristics as required for the test to be implemented. An example of illustrative phone characteristics is shown in Table 1 below.

TABLE 1

| | |
|---|---|
| ID = | 123110 |
| Telephone No. = | 555-4321 |
| Switch Line No. = | 4321 |
| Type = | ISDN |
| Ring = | 5 |
| Display Type = | Alphanumeric |
| Dial = | DTF |
| Feature A = | Call Forwarding |

TABLE 1-continued

| | |
|---|---|
| Feature B = | Speed Calling |
| Feature C = | Call Waiting |

In the above table, each phone is assigned a unique identification number (ID) in addition to an assigned conventional telephone number and a switch line number corresponding to the line associated with switch 10. A telephone type is indicated in the illustrated example as ISDN. A ring parameter characteristic is utilized to indicate the type of audible ring signal selected by user, if selectable. The type of display, if any, is indicated as well as the type of dialing utilized. Features A, B, and C correspond to call forwarding, speed calling, and call waiting which are switch features available to the exemplary telephone. It will be apparent that Table 1 is merely an illustrative example of the many features and conditions which may be utilized, depending upon the capability of the telephone devices and the switch 10. Of course, not all features supported by the switch can be utilized by all telephone devices. For example, LED lights on ISDN telephones that denote active/inactive states to a user will not be available for analog telephone tests.

Figure 4:
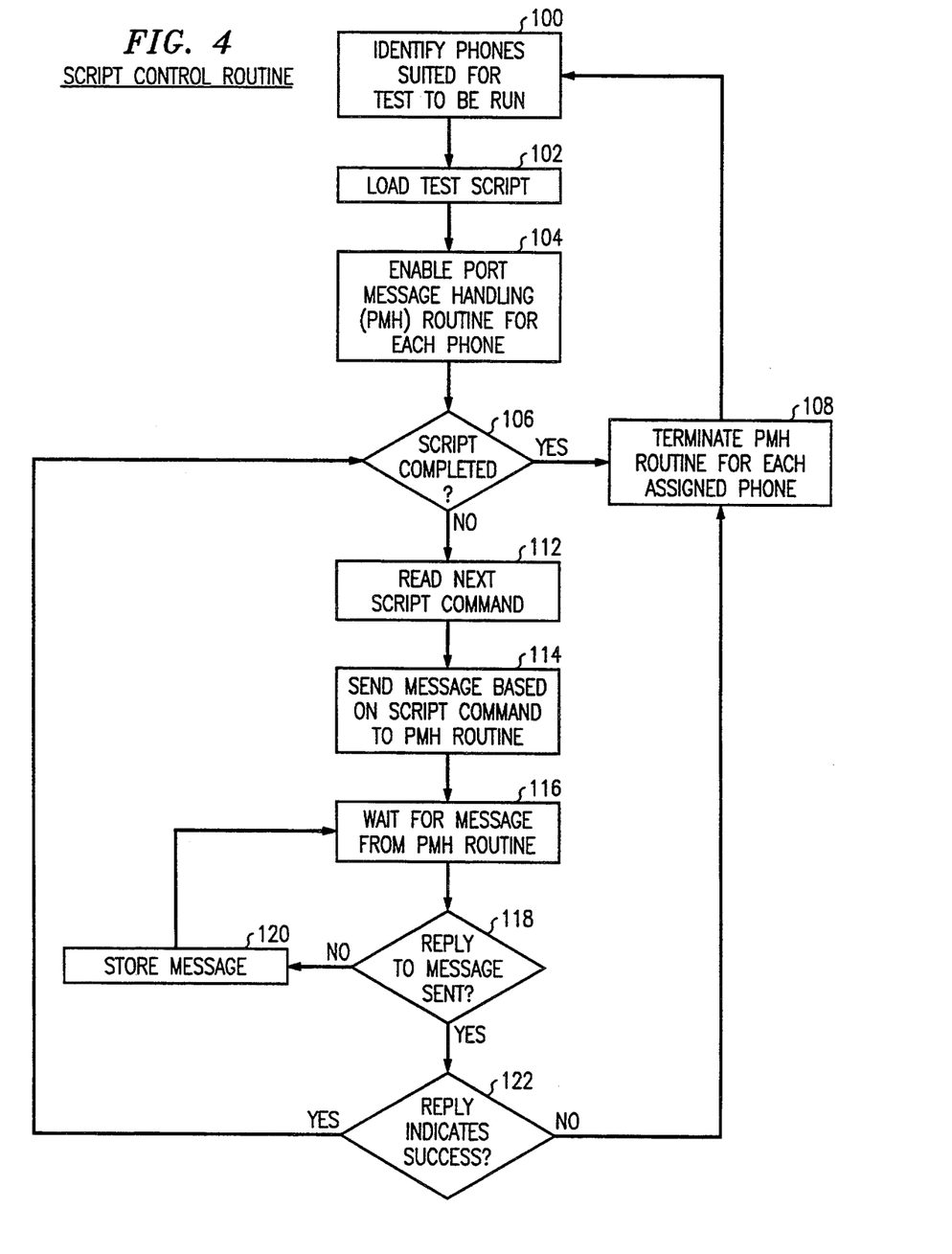
FIG. 4 is a flow diagram of a script control routine in accordance with the present invention.
Figure 5:
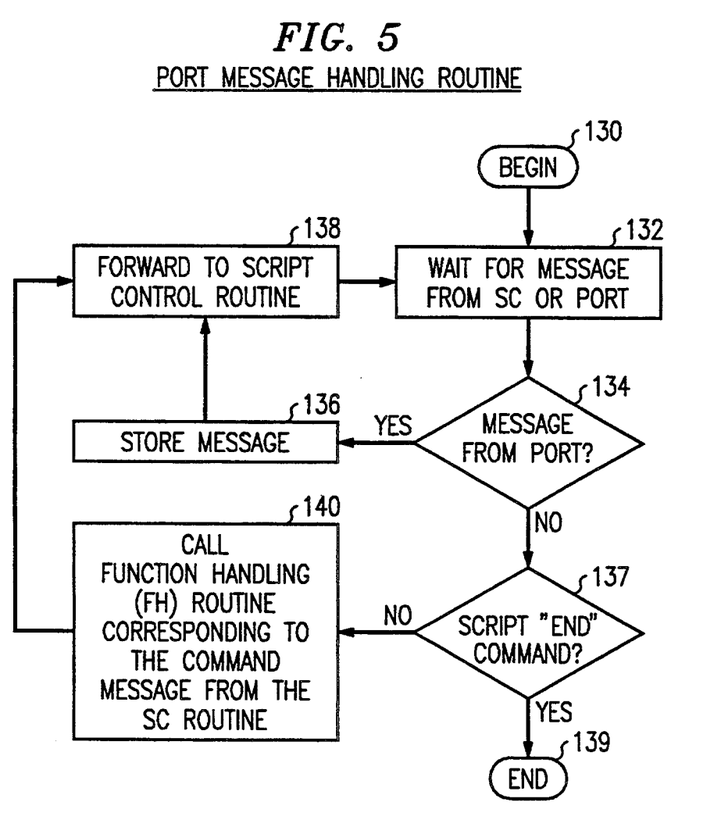
FIG. 5 is a flow diagram of a port message handling routine as referenced in FIG. 4.

FIG. 4 illustrates a script control (SC) routine utilized by personal computer 20 in accordance with the present invention. In step 100 a person seeking to run tests identifies phones suited for the tests to be run. As explained above with regard to Table 1, each of the phones is preferably characterized with identified characteristics enabling the user to identify appropriate phones. The selection may be implemented manually by entering identification codes of particular phones that we suitable or a data base may be utilized to facilitate selection of phones having desired parameters for use. A test script is loaded, as indicated in step 102. The test script consists of a sequential set of commands, including command messages and status inquiry messages, to be transmitted to a test phone to initiate a function, or action, or request the status of a parameter as represented by a reply message sent by the telephone. The test script may be entered line-by-line by the user or may consist of a stored sequence of steps utilized to test predetermined switch functions. Preferably, the script is written in a high level computer language which can be readily understood by the test user. In step 104 a port message handling (PMH) routine further described in FIG. 5 is enabled for each selected phone. The PMH routine may be manually enabled by the test user or automatically enabled upon selection of each associated phone in step 100.

In step 106 a determination is made if the script has been completed, i.e., have all of the commands associated with the sequential script steps been executed? If YES, the PMH routine for each selected test phone is terminated in step 108 and the script control routine returns to step 100 to begin another script. The PMH routine associated with each phone is released so that other scripts which may be run subsequently to the illustrative routine will then be able to access the phone. Each phone can be accessed by only one script at any given time. A NO determination by step 106 results in the next script command being read as indicated by step 112. In step 114 a message is sent based on the script command to the PMH routine which provides further processing of the command. Ultimately, corresponding signals are transmitted to the test phone connected by an RS-232 supported line 22. After the message has been sent as indicated in step 114, step 116 causes the process to wait for a message received from the PMH routine before proceeding further. Upon receiving a message from the PMH routine, a determination is made in step 118 of whether the message received from the PMH routine is a reply sent in response to the previously transmitted message in step 114. That is, does the reply message of step 118 consist of a valid reply to the message transmitted by step 114? A NO determination indicates that a reply was received but that the reply was not to the specific message sent in step 114. Such a reply is stored as indicated in step 120 for later analysis with the control again passing to step 116 to await another message to be transmitted from the PMH routine. A YES determination by step 118, indicating that the reply was a responsive reply to the message sent in step 114, results a determination in step 122 if the reply indicates a successful step of the script. In step 122 the actual status of parameters of the test telephone is compared to an anticipated status of such parameters responsive to the previously sent command. A match of actual and anticipated parameters results in a successful test determination. A NO determination which indicates a test failure results in the execution of step 108 as previously discussed which terminates the routine. Since the general nature of the testing is to locate failures which normally correspond to problems, the subject test script terminates upon locating such a failure. The stored test data is later analyzed by the test user to determine the cause of the failure. A YES determination by step 122, indicating the successful completion of the script command, results in control being passed back to step 106 for processing of additional commands which may be contained within the script. Thus, the script control routine controls the execution of sequential commands in accordance with the present invention. Multiple scripts can be concurrently run by duplicating the sequence of steps as shown in FIGS. 4–6 for each script.

FIG. 5 is a flow diagram of a port message handling (PMH) routine in accordance with the present invention as referenced in FIG. 4. The PMH routine is initiated at BEGIN step 130. In step 132 the routine waits until a command is received from the script control routine or a reply message is received from a port 21, i.e., an inbound message to computer 20 over line 22 associated with the telephone under test. A decision is made in step 134 if the message is from a port, i.e., from a test telephone. A YES determination results in the message from the phone being stored as indicated in step 136 and the reply message being forwarded to script control routine as indicated in step 138, i.e., the reply message is received by step 116 of the script control routine. Following step 138, control returns to step 132 to receive another message. A NO determination by step 134 indicates that the message is not from a port and hence, is a command message transmitted by step 114. In step 136 a determination is made if the command message is a script "END" command. A YES determination results in the PMH routine terminating at END 138 since step 136 has indicated that the complete script has been completed by receipt of the "END" command. A NO determination by step 136 results in a function handling (FH) routine being called in step 140. This transfers control to the FH routine which will be described with regard to FIG. 6. Upon a return from the FH routine, control passes to step 138 for forwarding the information passed by the FH routine to the SC routine, and then goes back to step 132 in preparation for receiving another message.

Figure 6:
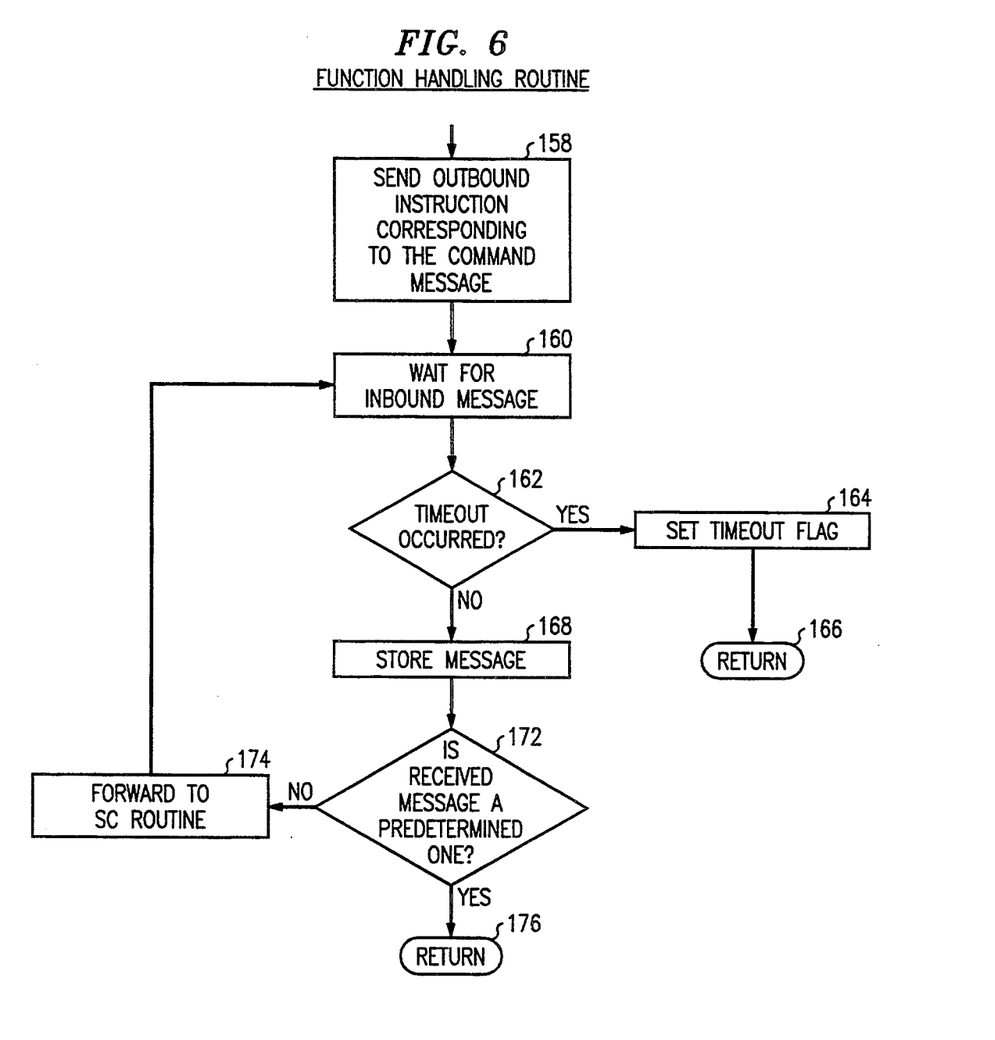
FIG. 6 is a flow diagram of a function handling routine as referenced in FIG. 5.

FIG. 6 illustrates an exemplary flow diagram of a function handling routine in accordance with the present invention as referenced in FIG. 5. Before describing the steps associated with this figure, it should be noted that a separate function handling routine exists for each command message generated in accordance with the script control routine described for FIG. 4. The function handling routine illustrated in FIG. 6 illustrates the steps suitable for handling the various different functions. Different command and status inquiry messages are described relative to Table 2.

An outbound port instruction corresponding to the received command message from the SC routine is sent via line 22 to the designated telephone in step 158. An inbound message from the corresponding port is awaited in step 160. Concurrently with step 160, a timer is activated and failure to receive a reply (inbound) message within a predetermined time results in the occurrence of a timeout as determined by step 162. A YES determination results in a timeout flag being set as indicated in step 164 followed by a RETURN in step 166 to step 140 in the PMH routine. The timeout flag parameter is passed back to step 140 in the PMH routine and is passed by step 138 back to step 116 in the SC routine. Step 122 in the SC routine interprets the meaning of the timeout flag; typically it will indicate an unsuccessful action but could indicate a successful action when no response to a command is designed as part of the communication protocol. It will be understood by those skilled in the art that the particular commands implemented, the corresponding responses, and the decision as to whether responses are mandatory., will vary depending on the specific information to be communicated and the system architecture. A NO determination by step 162 is indicative that an inbound message was received prior to the timeout. The received message is stored as indicated by step 168. A determination is made in step 172 if the inbound received message is the one being sought, i.e., was the inbound message responsive to the outbound instruction previously sent in step 158, or was the inbound message indicative of a different communication not related to the instructions sent in step 158. A YES determination results in the routine concluding at RETURN 176 which passes control back to step 140. A NO determination by step 172 indicates that the message received was not in response to the outbound instructions sent in step 158 and causes the message to be forwarded to step 116 in the SC routine by step 174. Control then passes back to step 160 to await another inbound message.

In order to implement automated testing in accordance with the present invention, various script commands (command messages and status inquiry messages) are used to communicate instructions to the selected telephone device that cause the telephone device to initiate an action or report on the status of a parameter or condition. A listing of exemplary script commands is provided in Table 2 which follows. It will be understood that these commands will be implemented by defining appropriate functions or subroutines dependent upon the computer language selected.

TABLE 2

Command Messages

On-hook

TABLE 2-continued

Off-hook
Dial N1
Push Button B1

Status Inquiry Messages

Tone Present T1
Ringing Present
Displayed Message
Lamp L1 Condition

The above commands will be briefly described. The ON-HOOK and OFF-HOOK commands indicate the corresponding action to be taken by the telephone device. That is, sending an OFF-HOOK script command will result in step 158 sending an outbound instruction corresponding to the command which will be understood by the corresponding telephone device to indicate that it is to take the action of coming "off-hook", that is, it will assume the condition just as if a person had manually lifted the receiver from the cradle of a telephone. The DIAL N1 command will result in the telephone device dialing the digits by N1. The PUSH BUTTON B1 command, used only for the ISDN telephone, will cause an instruction to be sent to the telephone causing it to generate signals transmitted to switch 10 indicating that a corresponding button (B1) on the phone had been pushed. The remaining commands listed in Table 2 are status inquiry messages which seek the status of conditions at the phone such as TONE PRESENT, i.e., are particular types of tones being transmitted from switch 10 to the associated phone. The DISPLAYED MESSAGE command requests the transmission from the phone to computer 20 of the alphanumeric message being displayed on a digital phone. The RINGING PRESENT command determines if ringing signals are being received by the phone. The LAMP L1 CONDITION seeks to determine the state of lamp L1, such as conventionally associated with different buttons on digital phones. It will be apparent to those skilled in the art that additional commands and status requests can be utilized to communicate with the particular phones or test devices utilized depending on their capability.

Table 3 illustrates an exemplary test in accordance with the present invention in which PC 20 utilizes two telephone devices coupled to switch 10 to place a test call through the switch to validate proper switch operation. In Table 3, the Telephone Device column indicates an originating call device A is utilized to place a call to a called device B. The Message Sent column indicates messages sent by PC 20 to the corresponding telephone device; the Message Received column indicates messages received by PC 20 from the corresponding telephone device.

TABLE 3

| Telephone Device | Message Sent | Message Received |
| --- | --- | --- |
| A | OFF-HOOK | OK |
| A | TONE PRESENT T0 | T0 |
| A | DIAL 555-1234 | OK |
| A | TONE PRESENT T1 | T1 |
| B | RING PRESENT | RING |
| B | OFF-HOOK | OK |
| B | DIAL 9 | OK |
| A | TONE PRESENT #9 | #9 |
| A | ON-HOOK | OK |
| B | ON-HOOK | OK |
|   | END |   |

Telephone device A is sent an OFF-HOOK message by PC 20; device A responds to receipt of the OFF-HOOK message by sending an OK message back to PC 20 indicating that the OFF-HOOK command message has been received and corresponding action taken. Next, a TONE PRESENT T0 status inquiry is sent to device A wherein T0 identifies dial tone as the tone to be detected. Detection of dial tone which is anticipated is confirmed by transmission of message "T0" from device A to PC 20. Device A is then instructed by command message DIAL 555-1234 to utilize DTMF digit transmission to dim the indicated number which has been predetermined to be the number of device B. A confirmation of "OK" of the number having been dialed is returned by device A. A TONE PRESENT T1 status inquiry is then sent to device A to determine if an audible ringing tone is present. A T1 message transmitted by device A indicates that the audible ringing tone is present as anticipated.

A RING PRESENT status inquiry is then transmitted to device B which responds with a reply message RING indicating that ringing is present. A command is then transmitted to device B to come OFF-HOOK which is confirmed with a reply message OK. In order to verify that a communication link has now been established between devices A and B, a DIAL 9 command message is transmitted to device B causing it to implement DTMF dialing of the #9 digit. Device B transmits the confirming reply message OK. Device A is then interrogated by a TONE PRESENT #9 message to determine if the tone has been received by device A thereby indicating a completed communication path. Receipt of the reply message #9 confirms that device A has received the DTMF 9 digit tone. Thus, the test has confirmed the correct operation of a number of features including a call path completion between devices A and B. The devices are returned to their original state by sending command messages to device A and B to go ON-HOOK; each device returns a reply message confirming the command and corresponding action by the message OK. The concluding message sent by PC 20 of END is sensed in SC routine step 106 to indicate completion of the test script thereby causing devices A and B to be released for future use in other tests.

Other embodiments and implementations of the present invention that differ from the illustrative embodiment are contemplated. For example, although PC 20 offers a convenient architecture for supporting the test programs, other apparatus capable of such support could be used such as other computer driven equipment employed at a central office. Also, the interface 28 and analog telephone 26 could be incorporated into a single unit.

Although an embodiment of the invention has been described and shown herein, the scope of the invention is defined by the claims which follow.

We claim:

1. An apparatus for testing a telecommunications switch in a telecommunications system that includes telephone devices connected to the switch and the apparatus, each telephone device including means for detecting signals sent from the switch, means for sending reply messages to the apparatus corresponding to the signals detected by the detecting means, means for receiving command messages from said apparatus, and means for generating signals sent to the switch corresponding to the command messages, the apparatus comprising:

means operating under the control of a program for directly sending said command messages over a first communication channel to a selected one of said telephone devices, said generating means responding to said command messages by generating corresponding signals sent to the switch via a second communication channel;

means, operating under the control of a program and responsive to said means for sending reply messages, for directly receiving said reply messages over said first communication channel from said selected one of said telephone devices, said reply messages representing the status of parameters associated with said selected one based on signals sent via the second communication channel by the switch;

means operating under the control of a program for identifying a received reply message that is responsive to a predetermined one of a previously sent command message;

means operating under the control of a program for determining if the actual status of parameters represented by said identified reply message matches an anticipated status of said parameters corresponding to said one of the command messages, a match of the actual and anticipated status of said parameters indicates an anticipated, successful reaction by said selected one of the telephone devices to said one command message and hence indicates successful switch operation.

2. The apparatus according to claim 1 further comprising means for storing said reply messages.

3. The apparatus according to claim 1 further comprising means for receiving control instructions from remote data terminal equipment, said control instructions controlling which of said command messages are to be sent by said means for sequentially sending command messages.

4. The apparatus according to claim 3 further comprising means for transmitting said reply messages to said remote data terminal equipment thereby allowing remote control of said apparatus.

5. The apparatus according to claim 3 wherein said receiving means comprises a modem.

6. The apparatus according to claim 1 further comprising asynchronous communication ports which carry the transmission of said command messages and the reception of said reply messages between said apparatus and the telephone devices.

7. The apparatus according to claim 1 further comprising means operating under the control of a program for sending status inquiry messages to said one of the telephone devices requesting an indication of the status of corresponding parameters of said selected one of the telephone devices, said reply messages responding to corresponding status inquiry messages.

8. A method for testing a telecommunications switch in a telecommunications system that includes telephone devices connected to the switch, each telephone device including means for detecting signals sent from the switch, means for sending reply messages to the apparatus corresponding to the signals detected by the detecting means, means for receiving command messages from said apparatus, and means for generating signals sent to the switch corresponding to the command messages, the method comprising the steps of:

sending said command messages over a first communication channel directly to a selected one of the telephone devices, said generating means responding to said command messages by generating a corresponding signal sent to the switch via a second communication channel;

directly receiving said reply messages over said first communication channel from said selected one of the telephone devices, said reply messages representing the status of parameters associated with said selected one based on signals sent via said second communication channel by the switch;

identifying a received reply message that is responsive to a predetermined one of a previously sent command message;

determining if the actual status of parameters represented by said reply identified message matches an anticipated status of said parameters corresponding to said one of the command messages, a determination of the validity of said match indicating a successful reaction by said selected one of the telephone devices to said one command message and successful switch operation.

9. The method according to claim 8 further comprising the step of storing said reply messages.

10. The method according to claim 8 further comprising the step of receiving control instructions from a remote data terminal equipment, said control instructions controlling which of said command messages are to be sent to the selected one of the telephone devices.

11. The method according to claim 10 further comprising the step of transmitting said reply messages to the remote data terminal equipment thereby allowing remote testing control.

12. The method according to claim 8 further comprising the step of providing asynchronous communications which carry the transmission of said command messages to and reception of said reply messages from said telephone device.

13. The method according to claim 8 further comprising the step of sending status inquiry messages to said one of the telephone devices requesting the status of corresponding parameters of said selected one of the telephone devices, said reply messages responding to corresponding status inquiry messages.

14. An arrangement for testing a telecommunications switch in a telecommunications system, said arrangement comprising:

telephone devices connected to said switch via first communication channels each telephone device including means for detecting signals sent from the switch, means for sending reply messages to the apparatus corresponding to the signals detected by the detecting means, means for receiving command messages from said apparatus, and means for generating signals sent to the switch corresponding to the command messages;

test apparatus connected to said telephone devices via second communication channels, said test apparatus including:

microprocessor means operating under the control of a program for directly sending said command messages via said second channels to a selected one of said telephone devices, said generating means responding to said command messages by generating signals sent via said first channels to the switch;

microprocessor means operating under the control of a program for directly receiving said reply messages via said second channels from said selected one of said telephone devices, said reply messages representing the status of parameters associated with said selected one based on signals sent via said first channels by the switch;

microprocessor means operating under the control of a program for identifying a received reply message that is responsive to a predetermined one of a previously sent command message;

microprocessor means operating under the control of a program for determining if the actual status of parameters represented by said identified reply message matches an anticipated status of said parameters corresponding to said one of the command messages, a match of the actual and anticipated status of said parameters indicates an anticipated, successful reaction by said selected one of the telephone devices to said one command message and successful switch operation.

15. The arrangement according to claim 14 further comprising means for storing said reply messages.

16. The arrangement according to claim 14 further comprising means for receiving control instructions from remote data terminal equipment, said control instructions controlling which of said command messages are to be sent by said microprocessor means for sending command messages.

17. The arrangement according to claim 16 further comprising means for transmitting said reply messages to said remote data terminal equipment thereby allowing remote control of said apparatus.

18. The arrangement according to claim 16 wherein said receiving means comprises a modem.

19. The arrangement according to claim 14 further comprising asynchronous communication ports which carry the transmission of said command messages and the reception of said reply messages between said apparatus and the telephone devices.

20. The arrangement according to claim 14 further comprising microprocessor means operating under the control of a program for sending status inquiry messages to said one of the telephone devices requesting the status of corresponding parameters of said selected one of the telephone devices, said reply messages responding to corresponding status inquiry messages.

* * * * *